J. Henderson,
Glass Furnace,

Nº 98,963.      Patented Jan. 18, 1870.

Witnesses:
A Bennerxendorf

Inventor:
J. Henderson
per Munn & Co
Attorneys

United States Patent Office.

JOHN HENDERSON, OF WHEELING, WEST VIRGINIA.

Letters Patent No. 98,963, dated January 18, 1870.

IMPROVEMENT IN GLASS-FURNACES.

The Schedule referred to in these Letters Patent and making part of the same.

To all whom it may concern:

Be it known that I, JOHN HENDERSON, of Wheeling, in the county of Ohio, and State of West Virginia, have invented a new and improved Eye-Plate for Glass-Furnaces; and I do hereby declare that the following is a full, clear, and exact description thereof, which will enable others skilled in the art to make and use the same, reference being had to the accompanying drawings, forming part of this specification.

This invention has for its object to prevent the rapid destruction, by heat, of the substance of glass-furnaces around the "eyes."

The invention consists in an "eye-plate," having a hollow metal wall surrounding the eye, through which a current of water is caused to pass, through connecting-tubes leading from and to a water-tank.

Similar letters of reference indicate corresponding parts.

Figure 1:
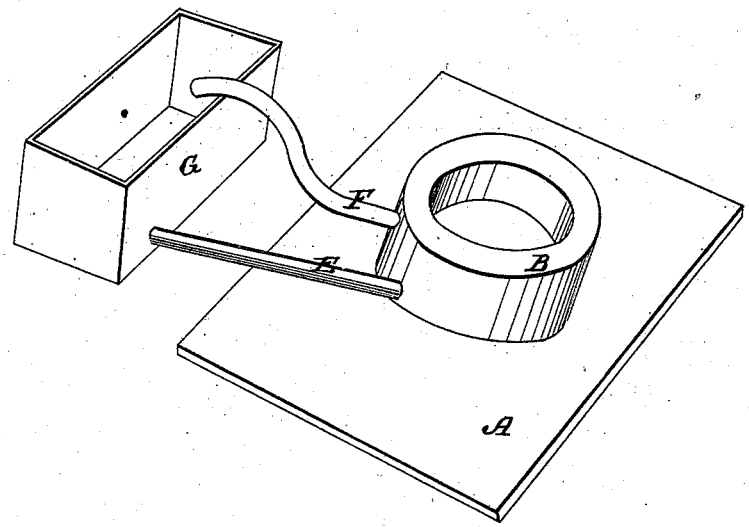
Figure 1 represents a perspective view of my improved device.
Figure 2:
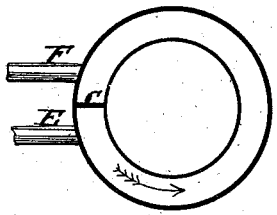
Figure 2 represents a horizontal section of the said hollow wall.

A represents a metal plate, and B represents a hollow wall, rising from one side thereof, and surrounding the "eye"-passage through it.

The said hollow space is divided by a partition, C.

D represents an induction-tube, leading from a water-tank into the space, at one side of the partition; and F represents an eduction-pipe, leading from the space at the other side of the said partition, back to the said tank. This tank, being supplied with cold water, will keep a circulation passing through the space of the said hollow wall B, around the eye.

This being placed in the opening in the furnace, where the eye is required to be, will prevent the crumbling and wearing away of the fire-brick, under the action of the fire, and will be protected from the fire by the said circulation.

Having thus described my invention,

I claim as new, and desire to secure by Letters Patent—

The improved "eye-plate" for glass-furnaces, consisting of the plate A, hollow wall B, tubes E and F, connecting with a water-tank, all substantially as specified.

JOHN HENDERSON.

Witnesses:
 FREDERICH CHORT,
 SAML. J. ELLIFRITS.